H. HARRINGTON.
PORTABLE CONVEYING APPARATUS.
APPLICATION FILED OCT. 2, 1914.
1,232,301.
Patented July 3, 1917.
3 SHEETS—SHEET 1.
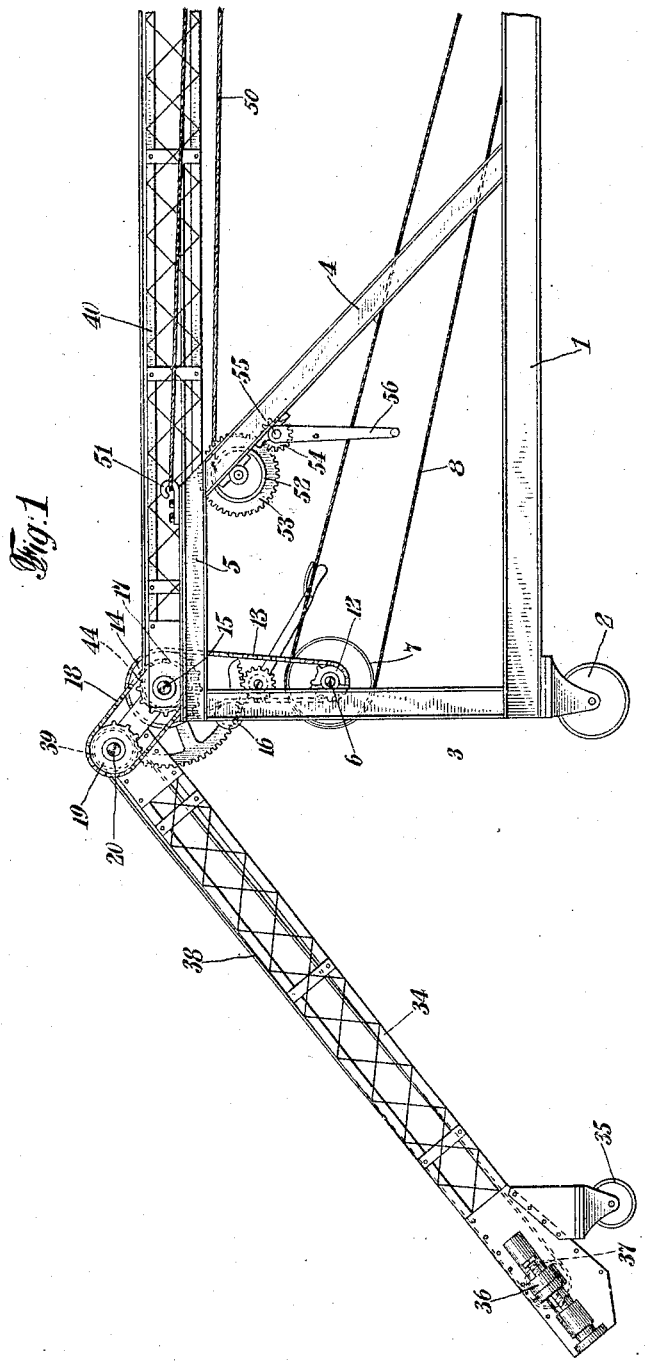

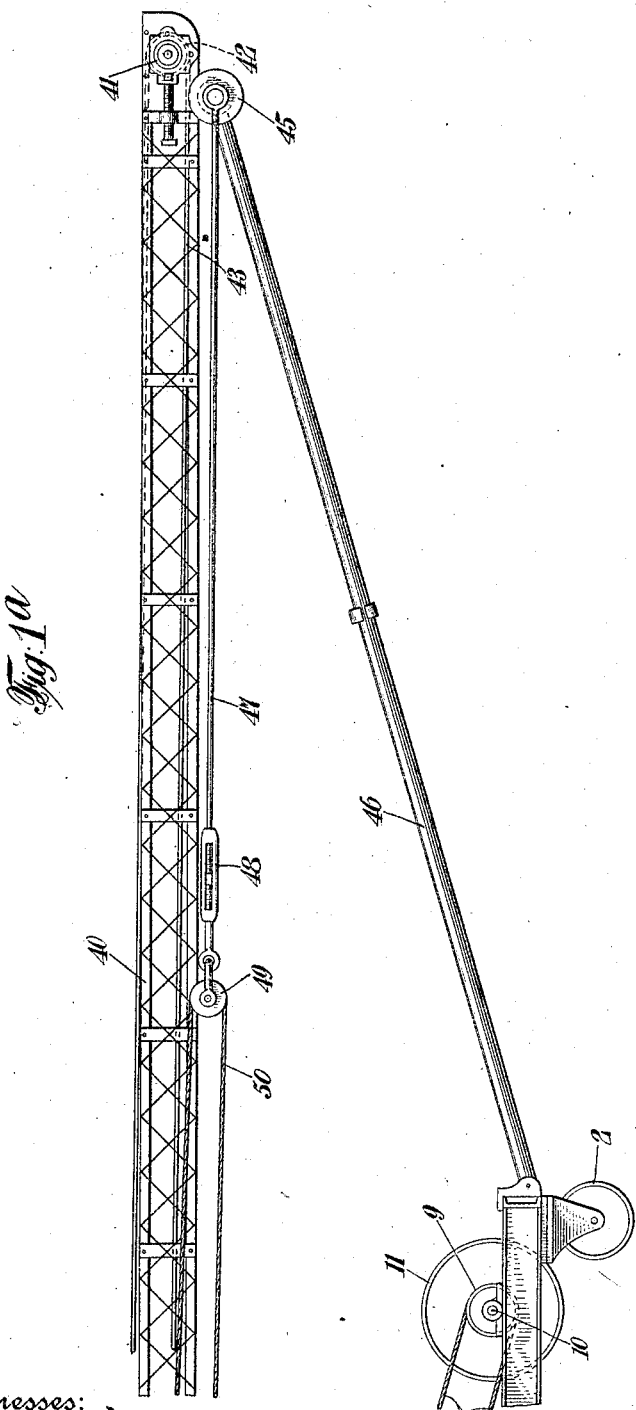

H. HARRINGTON.
PORTABLE CONVEYING APPARATUS.
APPLICATION FILED OCT. 2, 1914.

1,232,301.

Patented July 3, 1917.
3 SHEETS—SHEET 3.

Witnesses:
Harwood Ford
George W. Clark

Inventor
Henry Harrington
his Attorneys
Pindle, Wright & Small

UNITED STATES PATENT OFFICE.

HENRY HARRINGTON, OF WAUKEGAN, ILLINOIS.

PORTABLE CONVEYING APPARATUS.

1,232,301.  Specification of Letters Patent.  Patented July 3, 1917.

Application filed October 2, 1914. Serial No. 864,566.

*To all whom it may concern:*

Be it known that I, HENRY HARRINGTON, of Waukegan, in the county of Lake and in the State of Illinois, have invented a certain new and useful Improvement in Portable Conveying Apparatus; and do hereby declare that the following is a full, clear, and exact description thereof.

My invention relates particularly to elevators and conveyers adapted to raise and lower materials such, for example, as materials in bags, to and from piles thereof, and adapted to convey the materials from one point to another.

The object of my invention is to provide an apparatus of this character in which the portable apparatus may be readily adapted for use in connection with piles of varying kinds and in which the elevator, furthermore, may be readily used not only to convey materials up to the pile, but to convey the piled up materials downwardly away from the pile, and to convey materials from one point to another.

While my invention is capable of embodiment in many different forms, for the purpose of illustration I have shown only one form thereof in the accompanying drawings, in which—

Figures 1 and 1ª show a side elevation of an apparatus made in accordance with my invention;

Figure 2:
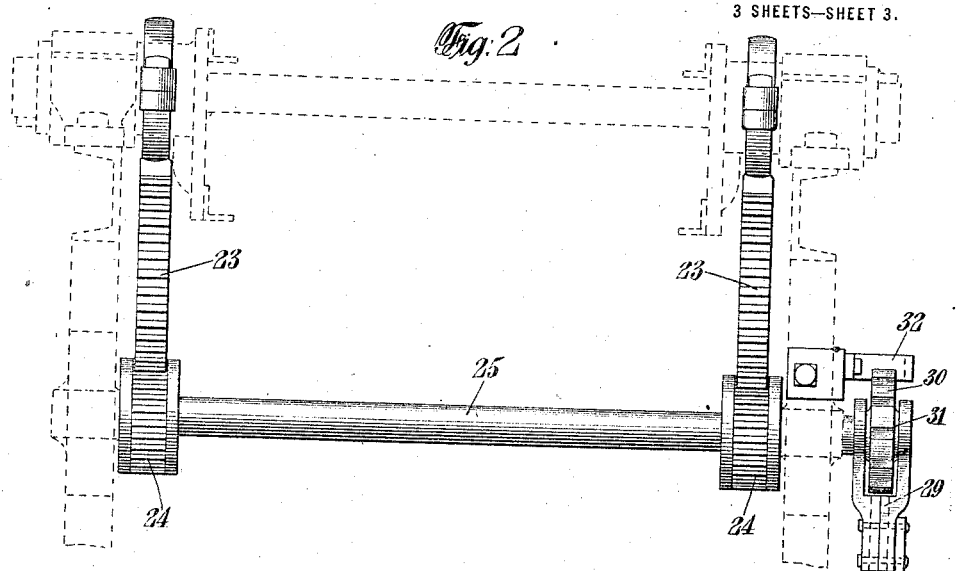
Fig. 2 is an enlarged detail of the same showing a front elevation.
Figure 3:
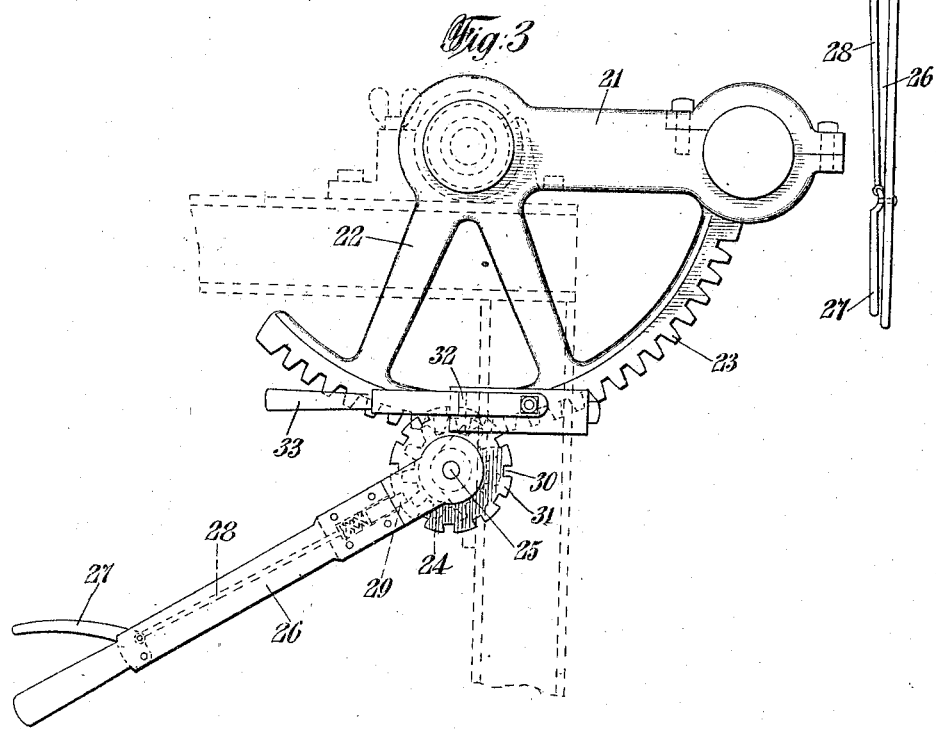
Fig. 3 is a side view of a detail of the elevator mechanism, said detail being the part shown in Fig. 2.

In the drawings I have shown a truck 1 of any desired construction, mounted upon wheels 2. Said truck 1 has a supporting frame comprised of vertical beams 3, inclined beams 4, and horizontal beams 5. The vertical beams 3 support, in suitable bearings, a horizontal shaft 6 carrying a pulley 7, said pulley being driven by a belt 8 from a pulley 9 on a shaft 10, carried by the truck 1, and being driven from any suitable source of power by a pulley 11. The shaft 6, furthermore, carries a sprocket 12 which is connected by a chain 13 to a sprocket 14 on a shaft 15 located on the horizontal beams 5. This chain 13, however, passes over an idler roll 16 supported in the vertical beams 3 in order to maintain the same taut. The shaft 15, furthermore, has a sprocket 17 which is connected by a chain 18 to a sprocket 19 on a shaft 20, which is supported in arms 21 forming portions of sectors 22 pivotally carried by the shaft 15 and loosely supported thereon. Said sectors 22 have gear teeth 23 which mesh with gears 24 located on a shaft 25, also supported by the vertical beams 3, said shaft 25 being adjustable manually by means of a hand lever 26 having an auxiliary lever 27 for operating, by means of a spring-pressed rod 28, a catch 29 for engaging teeth 30 on a ratchet wheel 31 tightly secured to the shaft 25. A further catch 32 is pivoted to a bracket 33 on the vertical upright 3, said catch 32 being provided to engage with the teeth 30 to maintain the shaft 25 in any desired adjusted position. Pivoted to the shaft 20 there is a lower conveyer arm 34 which is supported by rollers 35 on the ground at the other end thereof, and which has at the lower end, adjustable bearings 36 for supporting a roll 37, over which a conveyer band 38 passes, said conveyer band 38 being carried at its other end upon a roll 39 tightly secured to the shaft 20. Upon the shaft 15, furthermore, there is an upper conveyer arm 40 which has at its outer end adjustable bearings 41 for a roll 42 which carries a conveyer band 43, the other end of which passes around a pulley 44 secured to the shaft 15. The outer end of the upper conveyer arm 40 is supported upon a roll 45 which is located upon the end of a link 46 pivoted at its lower end to the truck 1, said link 46 having its outer end held in any desired position by a rod 47 having a turn-buckle 48 which is connected to a pulley 49 carrying a cable 50, one end of which is fixedly secured to a hook 51 supported upon one of the horizontal beams 5, while the other end thereof passes over a drum 52 having a gear 53 meshing with a gear 54 on a shaft 55 adapted to be rotated by a hand crank 56.

In the operation of my invention, power is applied to the conveyer bands 38 and 43 by any suitable source of power applied to the driving pulley 11. The upper conveyer arm 40 is adjusted to the height of the pile of material by rotating the hand crank 56 so as to wind up or unwind the cable 50 upon the drum 52. The movement of the cable 50 in this manner elevates or lowers the link 46 and elevates or lowers therewith the upper conveyer arm 40. If the material is to be conveyed upwardly to a pile, the lower conveyer arm 34 is located in the position shown in Fig. 1. If, however, the material is to be conveyed downwardly, away from the pile, the catch 32 is released and the hand crank 26 is operated so as to allow the shaft 25 to rotate a distance sufficient to lower the upper end of the conveyer arm 34 to a point below the level of the upper conveyer arm 40. The catch 32 is then again applied to the teeth 30 to retain the lower conveyer arm 34 in its adjusted position. Materials being conveyed downwardly from the pile as, for example, in bags, may now readily pass downwardly along the upper conveyer arm 40 and finally down the lower conveyer arm 34 until they have reached the ground. When it is desired to convey the materials upwardly to a pile, the position of the upper end of the lower conveyer arm 34 is again shifted until said upper end is above the level of the upper conveyer arm 40. As the height of the pile of material varies it will be understood that the height of the outer end of the upper conveyer arm 40 is adjusted by rotating the hand crank 56, to conform to the elevation of the pile. It is to be understood however that my invention is applicable to any belt conveyer system where the direction of movement of the materials is to be reversed.

While I have described my invention above in detail, I wish it to be understood that many changes may be made therein without departing from the spirit of my invention.

I claim:

1. In combination, a first conveyer arm, a second conveyer arm and means for adjusting the relative elevations of the adjacent ends of the conveyer arms, comprising a link connecting said two ends, and a sector fixed to the link, and a gear for moving the sector.

2. In combination, a first conveyer arm, a second conveyer arm and means for adjusting the relative elevations of the adjacent ends of the conveyer arms, comprising a link connecting said two ends, a sector fixed to the link, a gear for moving the sector and a toothed wheel and catch for maintaining the adjustment of the parts.

3. A conveyer having a section of fixed elevation, an adjacent arm having its free end provided with a supporting means permitting lateral movement of said end, and a connection between the adjacent ends of said section and arm, and means to move said connection to vary the elevation of the adjacent end of the arm.

4. A conveyer having a section of fixed elevation, an adjacent conveyer arm, a link pivoted to the adjacent ends of said section and arm, and means connected to said link to produce angular movement of the latter to vary the relative elevation of said adjacent ends.

5. In combination, a pair of adjacent conveyer arms, a link pivoted to an end of one arm, a shaft supported by said link and journaled in the adjacent end of the other arm, and means for rotating said link to vary the relative elevation of said adjacent ends.

6. In combination, a pair of adjacent conveyer sections, connection between the adjacent ends of said sections, and means to move said connection to vary the relative elevation of said adjacent ends.

7. In combination, a pair of adjacent conveyer sections, a link connecting the adjacent ends of said sections, and means for moving said link to vary the relative elevation of the adjacent ends of said sections while maintaining substantially a constant elevation of the remote ends of said sections.

8. In combination, a pair of adjacent conveyer sections, links pivoted to the adjacent ends of said sections, and means to impart angular movement to said links about one of said pivots to vary the relative elevation of the adjacent ends of said sections while maintaining substantially a constant elevation of the remote ends of said sections.

9. A conveyer having a section of fixed elevation, an adjacent movable section, links pivoted to the adjacent ends of said sections, and means to impart angular movement to said links about the pivot of said fixed section to vary the elevation of the adjacent ends of the movable section while maintaining substantially a constant elevation of the remote ends of said sections.

10. A conveyer having a section of fixed elevation, an adjacent section having a roller support at its free end, and a connection between the adjacent ends of said sections, and means to move said connection to vary the relative elevation thereof.

In testimony that I claim the foregoing I have hereunto set my hand.

HENRY HARRINGTON.

Witnesses:
　HARWOOD FROST,
　GEORGE W. CLARK.